US012564953B2

(12) United States Patent
Adelson et al.

(10) Patent No.: US 12,564,953 B2
(45) Date of Patent: Mar. 3, 2026

(54) LEARNING PHYSICAL FEATURES FROM TACTILE ROBOTIC EXPLORATION

(71) Applicant: Massachusetts Institute of Technology, Cambridge, MA (US)

(72) Inventors: Edward Adelson, Winchester, MA (US); Branden Romero, Brighton, MA (US); Filipe Fernandes Veiga, Cambridge, MA (US); Shaoxiong Wang, Cambridge, MA (US); Chen Wang, Shanghai (CN)

(73) Assignee: Massachusetts Institute of Technology, Cambridge, MA (US)

( * ) Notice: Subject to any disclaimer, the term of this patent is extended or adjusted under 35 U.S.C. 154(b) by 219 days.

(21) Appl. No.: 18/025,928

(22) PCT Filed: Oct. 22, 2021

(86) PCT No.: PCT/US2021/056180
§ 371 (c)(1),
(2) Date: Mar. 13, 2023

(87) PCT Pub. No.: WO2022/087360
PCT Pub. Date: Apr. 28, 2022

(65) Prior Publication Data
US 2024/0025039 A1 Jan. 25, 2024

Related U.S. Application Data

(60) Provisional application No. 63/104,631, filed on Oct. 23, 2020.

(51) Int. Cl.
*B25J 9/16* (2006.01)
*B25J 13/08* (2006.01)

(52) U.S. Cl.
CPC ............. *B25J 9/1664* (2013.01); *B25J 9/161* (2013.01); *B25J 9/1612* (2013.01); *B25J 9/163* (2013.01); *B25J 9/1653* (2013.01); *B25J 13/084* (2013.01)

(58) Field of Classification Search
CPC ........ B25J 9/1664; B25J 9/161; B25J 9/1612; B25J 9/163; B25J 9/1653; B25J 13/084; B25J 13/082; G05B 2219/40625
See application file for complete search history.

(56) References Cited

U.S. PATENT DOCUMENTS 9,613,180 B1 * 4/2017 Hoffmann .............. B25J 9/1612
10,065,323 B2 9/2018 Yeung et al.
(Continued)

FOREIGN PATENT DOCUMENTS

CN 104983469 B 9/2018
CN 110170994 A 8/2019
(Continued)

OTHER PUBLICATIONS

Learning robot tactile sensing for object manipulation (https://www.researchgate.net/publication/287016331_Learning_robot_tactile_se nsing_for_object_manipulation).
(Continued)

*Primary Examiner* — Nhi Q Bui
(74) *Attorney, Agent, or Firm* — J. Robin Rohlicek

(57) ABSTRACT

Physical features of an object from tactile robotic exploration, including by manipulation of the object with an effector having a tactile sensor that provides measurements representative of physical interaction of the effector and the object. This exploration may include performing a predetermined set of manipulations of the object using the effector. Measurements made during the manipulations are used to form a data representation of physical characteristics of (Continued)

the object, and this data representation is used to control further motion of the object.

27 Claims, 5 Drawing Sheets

(56) References Cited

U.S. PATENT DOCUMENTS

| | | | |
|---|---|---|---|
| 2015/0306761 A1* | 10/2015 | O'Connor | G06N 3/0464 |
| | | | 700/250 |
| 2019/0039838 A1 | 2/2019 | Curhan et al. | |
| 2019/0385022 A1* | 12/2019 | Jang | G06N 3/0464 |
| 2020/0215685 A1* | 7/2020 | Jamali | B25J 9/1697 |
| 2020/0246980 A1* | 8/2020 | Kuppuswamy | B25J 15/0033 |
| 2020/0316782 A1 | 10/2020 | Chavez et al. | |
| 2020/0324409 A1 | 10/2020 | Gonzalez Aguirre et al. | |
| 2021/0146532 A1* | 5/2021 | Rodriguez Garcia | |
| | | | B25J 9/0087 |

FOREIGN PATENT DOCUMENTS

| | | | | |
|---|---|---|---|---|
| WO | WO-2017154254 A1 * | 9/2017 | | B25J 15/08 |
| WO | 2020010328 A1 | 1/2020 | | |

OTHER PUBLICATIONS

Adaptive grasping using tactile sensing (https://www.diva-portal.org/smash/get/diva2:1092710/FULLTEXT02.pdf).

Wang et al. "SwingBot: Learning Physical Features from In-hand Tactile Exploration for Dynamic Swing-Up Manipulation" arXiv.org, Jan. 28, 2021, retrieved on [Jan. 4, 2022] retreived from the internet <URL: https://arxiv.org/pdf/2101.11812.pdf> entire document.

International Search Report, PCT Application No. PCT/US2021/056180, mailed Jan. 28, 2022 (3 pages).

* cited by examiner

LEARNING PHYSICAL FEATURES FROM TACTILE ROBOTIC EXPLORATION

CROSS-REFERENCES TO RELATED APPLICATIONS

This application is a national stage of International Application No. PCT/US2021/056180 filed on Oct. 22, 2021, which claims the benefit of U.S. Provisional Application No. 63/104,631 filed Oct. 23, 2020, the contents of which are herein incorporated by reference.

BACKGROUND OF THE INVENTION

This invention relates to robotic manipulation of objects, and more particularly to learning physical features of objects from tactile robotic exploration.

Certain types of robot manipulation tasks may be extremely sensitive to variations of the physical properties of the manipulated objects. One such task is manipulating objects by using gravity or arm accelerations, increasing the importance of mass, center of mass, and friction information.

SUMMARY OF THE INVENTION

In one aspect, in general, a method for operating a robot includes causing the robot to grasp an object with an effector that includes a tactile sensor for providing measurements representative of physical interaction of the effector and the object. The robot then performs a set of manipulations of the object using the effector, and measurements from sensors including the tactile sensor are acquired during those manipulations. A data representation of physical characteristics of the object, which may be referred to as an "embedding" is then determined from the acquired measurements. A further motion of the object is then controlled according to the data representation of the physical characteristics and a characteristic of a desired motion of the object.

Aspects may include one or more of the following features.

Performing the set of manipulations comprises performing one or both of a tilting manipulation of the object and a swinging manipulation of the object.

Controlling the further motion of the object comprises performing a swing-up motion of the object.

The tactile sensor provides measurements of characteristics of a physical interaction between the effector and the object over an area of contact between the effector and the object.

The measurements of characteristics of the physical interaction comprise measurements or displacement and/or force at a plurality of locations in an area of contact between the effector and the object.

Acquiring the measurements from the tactile sensor comprise acquiring a time sequence of measurements of the characteristics over the area of contact.

Forming the data representation of the physical characteristics of the object comprises using a first machine-learned transformation configured with values of configuration parameters.

The values of the configuration parameters are determined using a plurality of objects manipulated using known controls of motion of said objects.

The method further comprises determining the configuration parameters using a plurality of objects using the known controls of motion.

Determining the configuration parameters includes manipulating each object of the plurality of objects with an effector having a tactile sensor providing measurements representative of physical interaction of the effector and the object, acquiring measurements from the tactile sensor during those manipulations, and then using the acquired measurements and known characteristics of the objects of the plurality of objects to determine the configuration parameters.

Using the first machine-learned transformation comprises using a first artificial neural network trained using sensor measurements acquired during manipulation of the objects with known controls of motion.

The first artificial neural network comprises a convolutional neural network.

The data representation of physical characteristics of the object comprises a numerical embedding vector produced as output for the first artificial neural network representing said characteristics.

Controlling the further motion of the object according to the data representation of the physical characteristics and the characteristics of a desired motion of the object comprises using a computation model.

The computational model comprises a second artificial neural network.

The computational model implements a mapping a control input to an achieved motion for an object based on the data representation of physical characteristics of the object.

In another aspect, in general, a machine-implemented controller for a robot is configured to implement all the steps of any one of the methods set forth above.

In another aspect, in general, a non-transitory machine-readable medium comprising instructions stored thereon, and those instructions when executed by a machine-implemented controller cause the controller to perform all the steps of any one of the methods set forth above.

In another aspect, in general, a robot comprises an effector having a tactile sensor for providing measurements representative of physical interaction of the effector and objects grasped by the effector, and a controller configured to implement all the steps on any one of the methods set forth above.

Other features and advantages of the invention are apparent from the following description, and from the claims.

DETAILED DESCRIPTION

1 Overview

Figure 1:
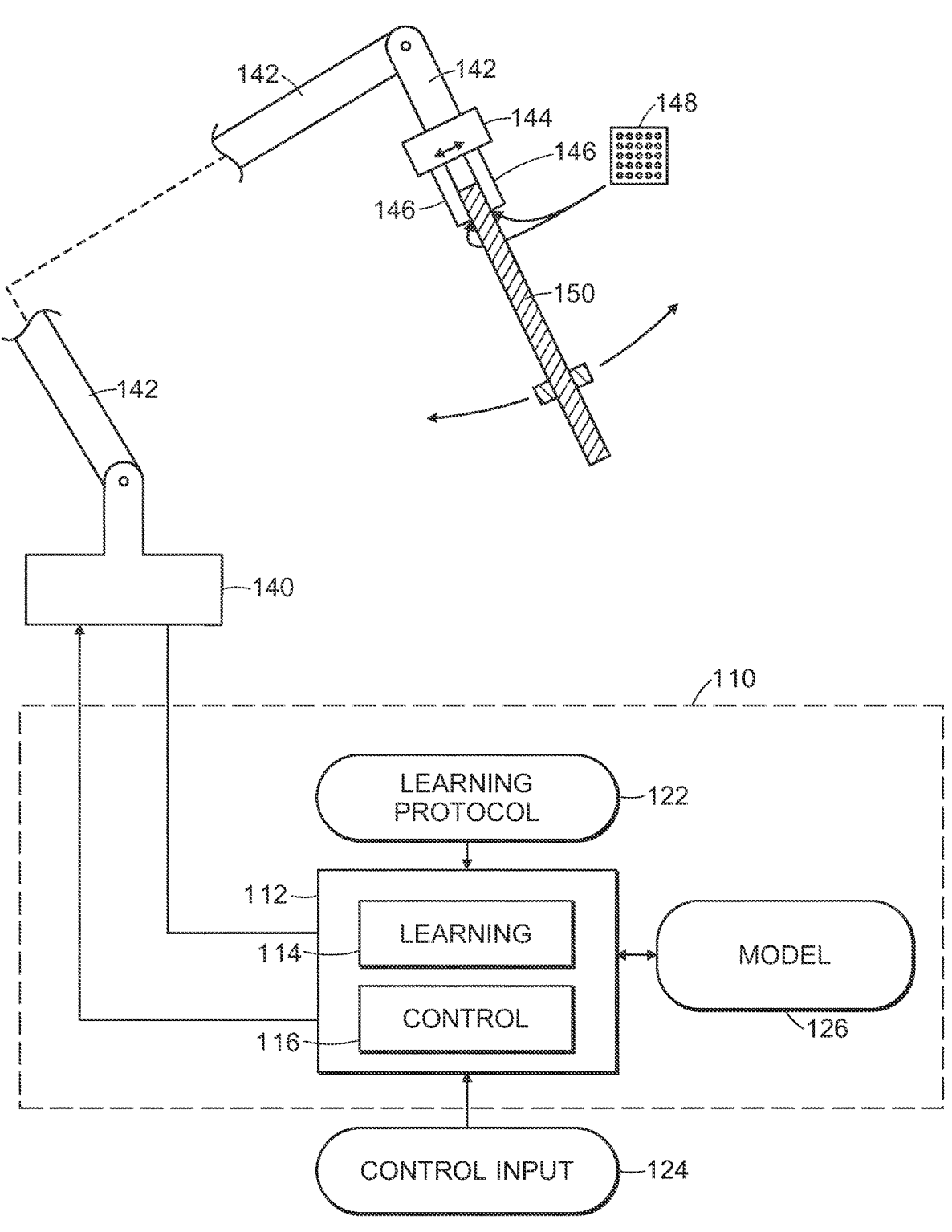
FIG. 1 is a schematic diagram of a robot.

Referring to FIG. 1, a robot 100 includes a physical manipulation and sensing system 140 (herein after referred to as the "physical robot") and a controller 110. As illustrated in FIG. 1, the physical robot has multiple limbs 142 that can be controlled to move an effector 144 in space. Other structures than a multi-limb robot can be used. The effector 144 can grasp an object 150, in the illustrated robot using grippers 146 that can be forced together to grasp the object. Each gripper has a tactile sensor 148, which has an array of sensors on the surfaces in contact with the object that provides localized displacement or force vectors between the grippers and the object.

Even if the robot can observe the physical structure of the object, for example using a camera system to determine its shape, certain types of robot manipulation tasks may be extremely sensitive to the physical properties of the manipulated objects. For example, some manipulation of the object may use gravity or arm accelerations, increasing the importance of total mass, location center of mass, moment of inertia and/or coefficient of friction. More generally, control of motion of the combination of the robot and the object being manipulated may depend on the physical properties of the object.

In the embodiment illustrated in FIG. 1, the controller 120 can operated in two modes. In a learning mode, a learning component 114 applies a learning protocol 112, which specifies a set of learning manipulations of the object using the effector 144. In general, the manipulations involve control of the effector to move the object in space and/or control the grip of the effector on the object (e.g., the force with which the object is grasped). Sensor output from the physical robot is provided to the controller, and the controller uses the sensor output to infer physical characteristics of the object. The controller stores a data representation of the physical characteristics in a model 126 of the object. The model of the object may explicitly or implicitly represent such characteristics as total mass, location of center of mass, moment of inertia, and coefficient of friction. The sensor output used to infer the physical characteristics includes the displacement or force vectors from the tactile sensors 148. Other sensor output may also (or alternatively) be provided from the physical robot, for example, forces, torques and/or angles within the physical robot, however the description below focuses on the use of the force sensors recognizing that other sensor outputs may be integrated in a like manner.

In an operational mode, the controller makes use of the model 126 to act on a control input 124 to cause a desired motion of the object by determining control inputs to the physical robot 140 that depend both on the control input and the physical properties of the object represented in the model 126.

In the embodiment of FIG. 1, the model 126 does not necessarily explicitly represent physical characteristics, and rather uses a vector embedding (e.g., a 40-dimensional real-valued vector) that is learned (i.e., estimated) in the learning mode and then used in the operational mode.

2 Tactile Sensor

As introduced above, a tactile sensor 148 is used to collect an array of vectors representative of force or displacement on the gripper surface, and more generally, a time series (e.g., a uniformly time-sampling) of such arrays during a leaning manipulation. One example of such a tactile sensor is an elastomeric tactile sensor available from Gelsight, Inc., of Waltham Massachusetts, which uses nonlinear properties of polydimethylsiloxane to sense forces on the sensors. Details of this sensor may be found in Yuan, Wenzhen, Siyuan Dong, and Edward H. Adelson, "Gelsight: High-resolution robot tactile sensors for estimating geometry and force," (*Sensors* 17, no. 12 (2017): 2762), incorporated herein by reference. Generally, the surface of the elastomer deforms when forces are applied to it, and a photometric stereo process can provide a height map that describes the displacement of the membrane surface along the z direction (i.e., perpendicular to the gripper surface). During contact, the membrane may also move tangentially. The tangential displacements (in x and y) are measured by printing markers on the membrane and tracking their x-y displacement using an imaging sensor. Therefore, depth map and the x-y displacement together provide a three-dimensional displacement that can be measured for each of the printed dots. In the exemplary use described below, the tactile sensor has an array of 14 by 12 markers on the surface, and only the x-y displacement is used. In the discussion below, the tactile sensor may be referred to as the "Gelsight," recognizing that alternative tactile sensors may be substituted.

The GelSight enables sensing of high-resolution information about the contact surface between the object and effectors. This enables the controller infer information about local geometry of the object for pose estimation. Furthermore, tangential displacements give rich information about the sheer forces and torques being applied to the sensing surface.

3 Exemplary Use

In an exemplary use of the approach outlined above, the goal is to enable the robot to swing up an unknown object to a desired pose (e.g., a final angle of between 0 and 200 degrees) after performing an exploratory learning manipulation. Two such learning manipulations are considered here: "shaking" and "tilting." These two manipulations are selected because they generally yield different types of physical information about the object.

Generally, the sensor output during the manipulations is used to determine an embedding vector, which does not explicitly represent the characteristics such as moment of inertia, yet provides salient information needed to map a new control for controlling the motion of the object to a target pose. In particular, the embedding provides an input or effectively parameterizes a forward model that maps from the control input (424) to the predicted final pose output (436) of the object.

Tilting the object to different angles provides information about the mass and center of mass. For example, at a low angle the measurements generally relate to mass of the object, while at a larger angle, the measurements provide information about the torque being applied to the sensor. Combining mass in torque estimates together provides information about the center of mass. In this exemplary use, the tilting manipulation involves tilting the object to different angles including to a first pose angle of 20 degrees and second pose angle of 45 degrees. Together, the two sensors, two angles, 14×12 markers, and two directions provides 2×2×14×12×2=1344 real-valued measurements.

The learning manipulation is performed with different objects from the set of template objects, in this experimental using nine different objects. These template objects have a variety of structures, for example with different masses, handle material (e.g., coefficient of friction), and moment of inertial.

Figure 2:
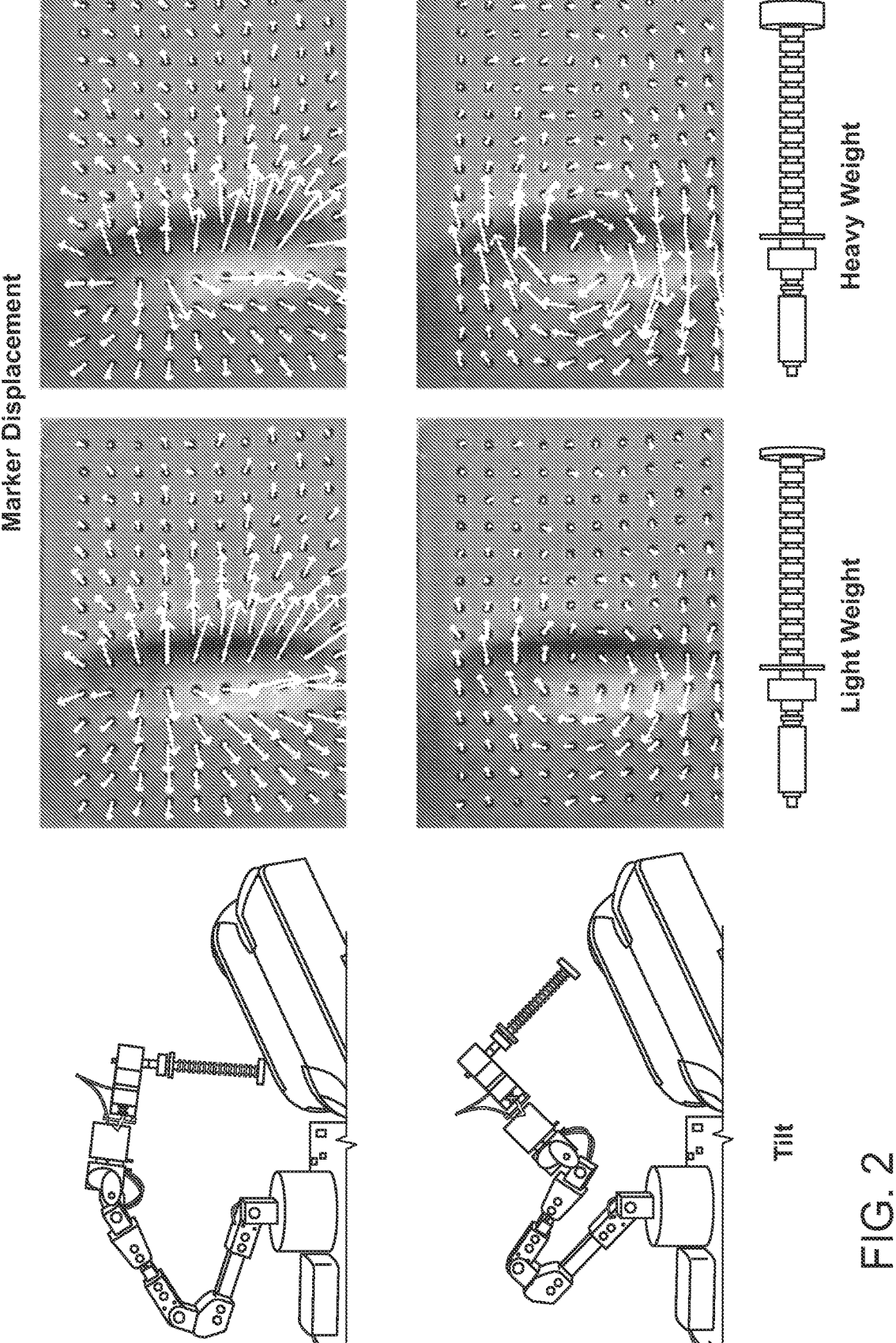
FIG. 2 is a diagram of two tilt poses of a tilt manipulation and corresponding tactile sensor outputs for two different objects.

Referring to FIG. 2, the marker displacements are illustrated for two pose different angles (top row at 0 degrees, and bottom row at 45 degrees) and two different template objects (right column is a heavy weight object and left column is a lightweight object).

Shaking the object in the second learning manipulation provides information related to properties such as coefficient of friction and moment of inertia. The shaking manipulation involves the robot holding the object in a 0-degree pose, then the robot first loosens the gripper force to enable a small range of rotation flexibility. Then, the robot starts a quick switch between forward and backward rotations (in this example plus and minus 5 degrees) on the joint of the end effector. During this process, the marker displacements are recorded in a sequence of frames of about 60-70 frames duration per trial.

Figure 3:
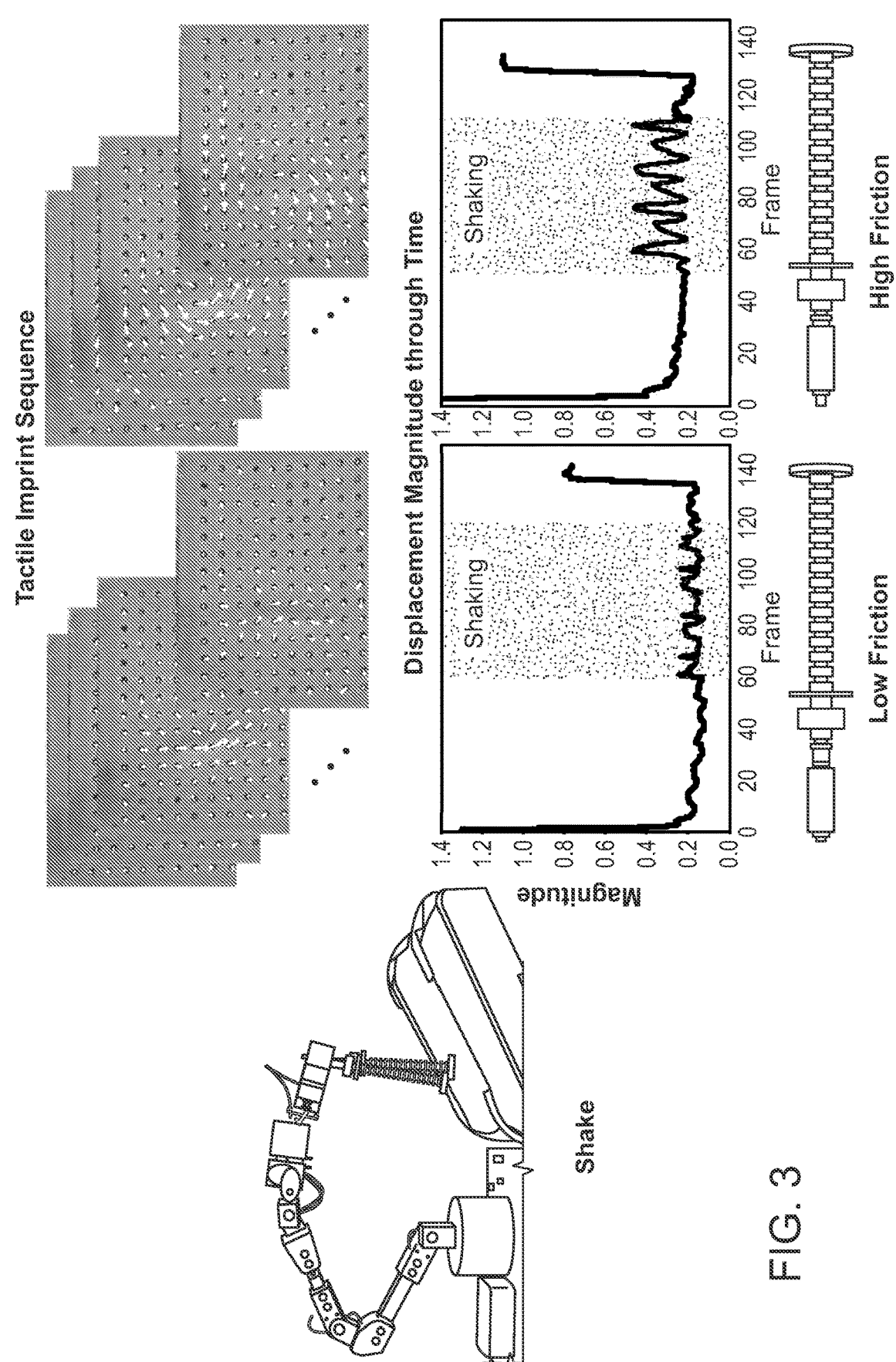
FIG. 3 is a diagram of a shake manipulation and time series of tactile sensor outputs for two different objects.

Referring to FIG. 3, a sequence of approximately 60 shaking frames (e.g., approximately frames 60 through 120) are collected for a low handle friction object (left) and a high handle friction object (right). A graph in each case shows an average magnitude of the marker displacements.

Figure 4:
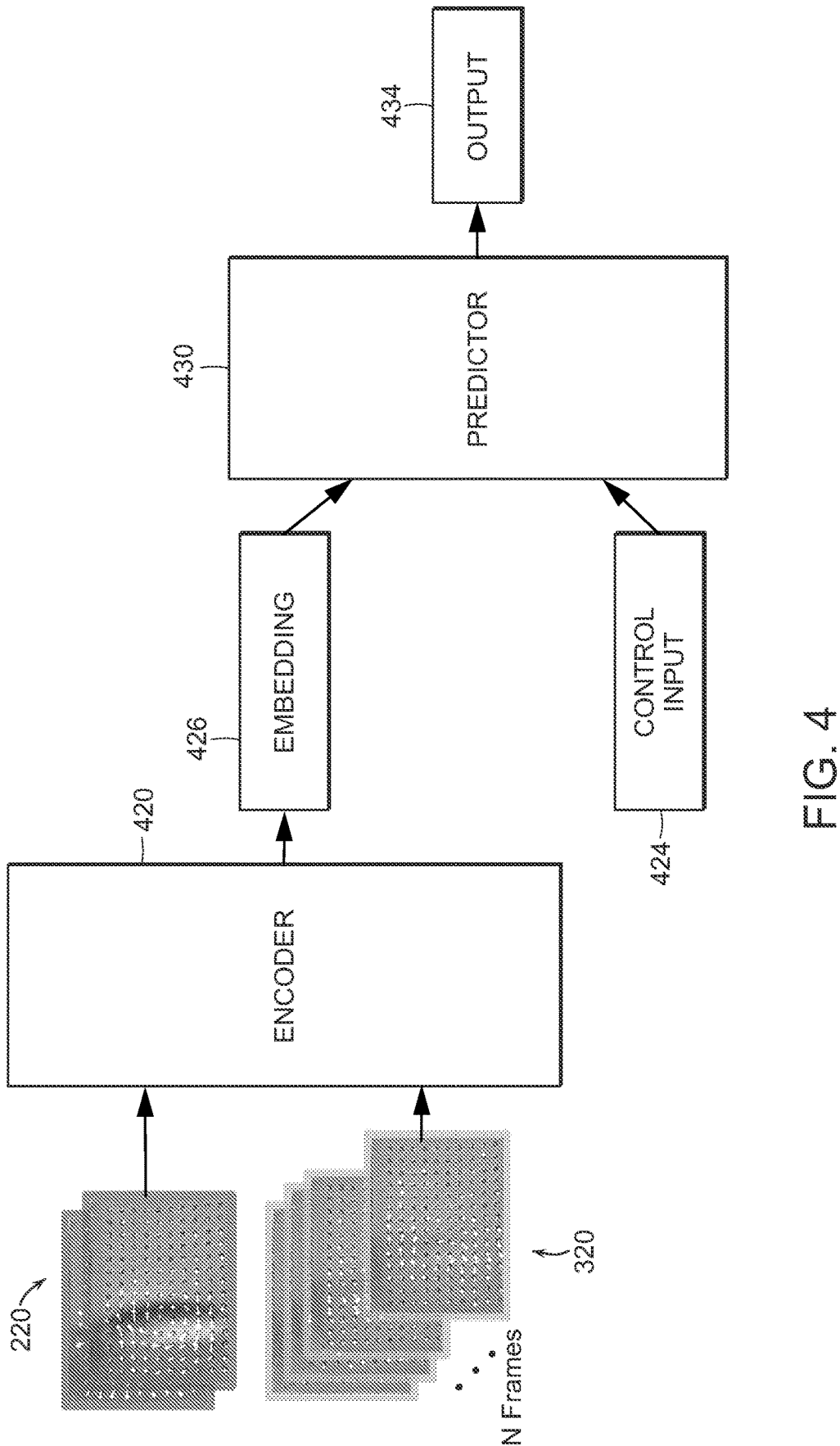
FIG. 4 is a diagram of an encoder and predictor.

Referring to FIG. 4, the learning mode involves training an encoder 420 and a predictor 430 using the sensor measurements 220 and 320 from the tilt learning manipulations and shake learning manipulations, respectively, of the template objects, and one or more instances of a control input 124 and corresponding output 434 (in this case the achieved pose angle). The embedding 426, which constitutes the model 126 of FIG. 1, is a 40-dimensional vector.

In this example, the control input 424 instructs the robot to perform a swing-up action using an impulse-momentum method. The first stage of the swing-up action begins by having the robot build up the object's linear and rotation momentum by simultaneously accelerating the object upwards and rotating the wrist in the direction of the swing while holding the object firmly. After a short period, the robot creates an impulse, by quickly accelerating the object downwards and rotating the wrist in the opposite direction of the swing. At the moment of the impulse the robot loosens the gripper, so that the inertia of the object can overcome the forces of rotational friction and gravity. Thus, the object freely rotates in-hand. After some time, the gripper is tightened to stop the motion of the object at some pose. A current position-based control is used for the gripper so that the robot automatically decides the gripper width for holding different objects tightly with the gripper force determined by using same motor torque for the gripper. When designing the action, the linear and rotational movements of the arm are predefined as well as the timing of gripper tightening, but the robot selects how much the gripper loosens at the impulse. This allows the robot to control the object's deceleration so that it can precisely control the object's end pose. Therefore, the control inputs 424 are the same other than the amount the gripper loosens at the impulse.

Figure 5:
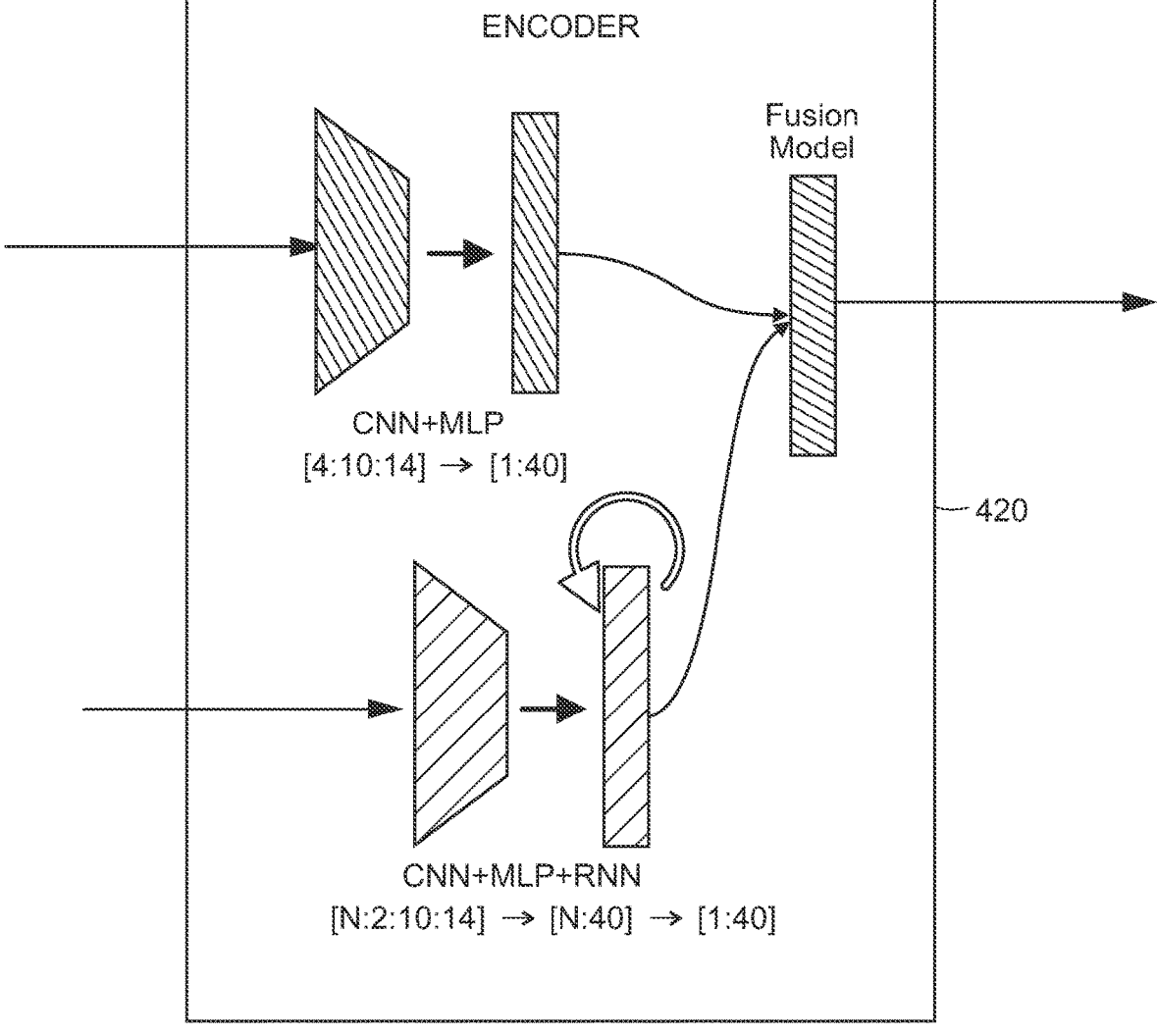
FIG. 5 is a diagram of an encoder.

Referring to FIG. 5, the encoder processes the tilt sensor measurements 220 using a convolutional neural network to produce a 40-dimensional output. The marker displacements for the two sensors and the different tilt angles are concatenated (i.e., into multiple input channels) and the array of the concatenated values is processed with convolutional kernels of size of 5 by 5, 3 by 3, and 2 by 2, with the last layers being fully connected to produce the 40-dimensional output. The encoder processes the shake measurements 320 using a convolutional network of the same architecture (but different weights) as used for the tilt measurements, followed by a recurrent network, which has a 40-dimensional output. The recurrent network is a long-short term memory (LSTM) architecture initialized with zero value hidden states. The 40-dimensional encoding of the tilt measurements and the 40-dimensional encoding of the shake measurements are combined by a fusion model, which output the ultimate 40-dimensional embedding.

Referring to FIG. 4, training of the encoder 420 and the predictor 430 is performed in a complete end-to-end manner using the final angle output 436 for self-supervision. That is, gradient-based training (e.g., using back-propagation)

adjusts the weights (i.e., the trainable parameters) of the encoder 420 and predictor to best match combinations of the learning sensor measurements and control input as the input and the achieve pose angle as output) for multiple different template objects and control inputs.

Having trained the encoder 420 and predictor 430, with a new unknown object, the controller first enters into the learning mode in which it performs the learning manipulations on the unknown object to generate an embedding 426 for that object using the previously trained encoder. The desired output 436 (i.e., the target pose angle) is known, and the control input 424 to achieve that desired output is to be determined. In this example, the control input is determined by a search over a set of possible control inputs, for example, by uniformly sampling the control inputs and for each prediction the resulting output using the predictor 430, recording the control input that most closely matches the target output. Other control approaches may be used with the predictor, including training a controller that substitutes for the search procedure.

4 Experiments and Results

The diversity of the training conditions highly influences the model's performance on unseen objects. To this end, template objects differ in one or more three major components: handle, rack, and weight. With these template objects, a dataset that contains 33 different objects was used to collect data with each object being used in 50 swing-up trials, performed with a random control parameter. These objects contain variations in different categories of physical proprieties: three different surface frictions on the handle: foam, slick tape, and plastic; three different masses, 3.7 g, 7.3 g and 14.5 g; and a pole-shaped rack (15.6 g) allowing for different placement of the disks for variance in center of mass (77-134 mm) and moment of inertia (0.03-g/m$^2$).

In each data collection trial, the robot first grasps the object and holds it a zero-degree pose. It then rotates its end effector into two angles (20 degrees, 45 degrees), as introduced above, and records the marker information from the tactile sensor. After that, the robot resets the object pose to zero degrees and loosens the gripper force before it starts the shaking manipulation as introduced above. The sensor array sequence is recorded. Then the robot selects a random control parameter and starts its swing up. The final angle in the end of the swing-up is saved as the supervision ground truth for training the predictor. At the end of each data collection trial, the robot opens the gripper and lets the object fall into a recycle box at the bottom of the system. The recycle box returns the object to the same initial position every time so that the robot can automatically start another trial.

Evaluation of performance compared different methods of computing the embedding of an object. The "Combined" method is as described above using both the shaking and tilting measurements. The "Tilting" and the "Shaking" methods use only one learning mode. For comparison, the "PP" method directly encodes physical parameters of friction, mass, center of mass and moment of inertia in the embedding without performing any leaning manipulations. A "None" method does not use any embedding, and "Random" further ignores the control input and picks a random control. Two test conditions were used. The "Seen" test set holds out 10% of trials of the same objects used in training for testing, while the "Unseen" test set holds out approximately 18% of the object for testing so there is no overlap of objects between training and testing. The average absolute error in the output pose angle is summarized in the following table:

|       | Random | None | PP   | Tilt | Shake | Combined |
|-------|--------|------|------|------|-------|----------|
| Seen  | 66.7   | 25.4 | 11.0 | 13.3 | 10.9  | 10.2     |
| Unseen| 66.7   | 26.8 | 18.5 | 17.6 | 15.0  | 12.9     |

5. Alternatives and Implementations

More complex scenarios than the exemplary use and experimental results presented above make use of the general approach of learning object properties by tactile manipulation followed by the use of a trained encoder and predictor with a new unknown object.

Note that the training in this approach yields an embedding that may be appropriate for the range or variety of tasks that are used during training. Therefore, the embedding can be considered to be task specific. Generally, this yields embeddings that are close for objects for which control inputs for the same output are close. In practice, a robot may be trained with one or more task-specific encoders to provide the ability of tactile sensing that is appropriate for the task that is to be performed on an unknown object.

The approaches described above may be applied to more complex situations in which learning manipulations are used to infer characteristics of an object and/or a grip on the object in situations in which a robot effector has a loose grip (and more particularly a grip with a controllable strength/tightness) and/or in which the robot may have flexible joints or limbs.

Furthermore, other training paradigms may be used instead of or in addition to determining a predictor that maps from a control to an achieved output. For example, a reinforcement learning approach may be used to determine a control policy for determining robot control input to achieve a desired goal (e.g., target pose), for example, with the estimated embedding characterizing the object being represented in parameters of the policy or in a representation of the agent's view of the state of the robot-object system.

Embodiments may be implemented in software with stored instructions (on non-transitory machine-readable media) being used by processors of a computing environment (e.g., a digital controller, general purpose computer, etc.) to perform the steps described above. Embodiments may also use hardware, for example, in the form of application-specific integrated circuits (ASICs), field programmable gate arrays (FPGAs) and the like.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for operating a robot, the method comprising:
causing the robot to grasp an object with an effector, the effector including a tactile sensor providing measurements representative of physical interaction of the effector and the object;

causing the robot to perform a set of manipulations of the object using the effector;
acquiring measurements from the tactile sensor during said manipulations;
forming a data representation of physical characteristics of the object from the acquired measurements; and
controlling a further motion of the object according to the data representation of the physical characteristics and a characteristic of a desired motion of the object,
wherein
causing the robot to perform the set of manipulations of the object comprises causing a set of dynamic manipulations of said object,
acquiring the measurements from the tactile sensor during said manipulations comprises acquiring dynamic measurements based at least in part on kinematic properties of said object, and
forming the data representation of the physical characteristics of the object comprises forming said representation to encode the kinematic properties of said object.

2. The method of claim 1 wherein performing the set of manipulations comprises performing at least one of a tilting manipulation of the object and a swinging manipulation of the object.

3. The method of claim 2, wherein performing the set of manipulations comprises performing the tilting manipulation of the object and performing the swinging manipulation of the object.

4. The method of claim 1, wherein controlling the further motion of the object comprises performing a swing-up motion of the object.

5. The method of claim 1, wherein the tactile sensor provides measurements of characteristics of a physical interaction between the effector and the object over an area of contact between the effector and the object.

6. The method of claim 5, wherein the measurements of characteristics of the physical interaction comprise measurements of displacement and/or force at a plurality of locations in an area of contact between the effector and the object.

7. The method of claim 5, wherein acquiring the measurements from the tactile sensor comprises acquiring a time sequence of measurements of the characteristics over the area of contact.

8. The method of claim 1, wherein forming the data representation of the physical characteristics of the object comprises using a first machine-learned transformation configured with values of configuration parameters.

9. The method of claim 8, wherein the values of the configuration parameters are determined using a plurality of objects manipulated using known controls of motion of said objects.

10. The method of claim 9, further comprising determining the configuration parameters using a plurality of objects using the known controls of motion.

11. The method of claim 10, wherein determining the configuration parameters includes:
manipulating each of object of the plurality of objects with the effector;
acquiring measurements from the tactile sensor during said manipulations;
using the acquired measurements and known characteristics of the objects of the plurality of objects to determine the configuration parameters.

12. The method of claim 8, wherein using the first machine-learned transformation comprises using a first artificial neural network trained using sensor measurements acquired during manipulation of the objects with known controls of motion.

13. The method of claim 12, wherein the first artificial neural network comprises a convolutional neural network.

14. The method of claim 12, wherein the data representation of physical characteristics of the object comprises a numerical embedding vector produced as output for the first artificial neural network representing said characteristics.

15. The method of claim 1, wherein controlling the further motion of the object according to the data representation of the physical characteristics and the characteristics of a desired motion of the object comprises using a computation model.

16. The method of claim 15, wherein the computational model comprises a second artificial neural network.

17. The method of claim 15, wherein the computational model implements a mapping of a control of motion to an achieved motion for an object based on the data representation of physical characteristics of the object.

18. A machine-implemented controller for a robot configured to implement all the steps of:
  causing the robot to grasp an object with an effector, the effector including a tactile sensor providing measurements representative of physical interaction of the effector and the object;
  causing the robot to perform a set of manipulations of the object using the effector;
  acquiring measurements from the tactile sensor during said manipulations;
  forming a data representation of physical characteristics of the object from the acquired measurements; and
  controlling a further motion of the object according to the data representation of the physical characteristics and a characteristic of a desired motion of the object
  wherein
    causing the robot to perform the set of manipulations of the object comprises causing a set of dynamic manipulations of said object,
    acquiring the measurements from the tactile sensor during said manipulations comprises acquiring dynamic measurements based at least in part on kinematic properties of said object, and
    forming the data representation of the physical characteristics of the object comprises forming said representation to encode the kinematic properties of said object.

19. A non-transitory machine-readable medium comprising instructions stored thereon, wherein the instructions when executed by a machine-implemented controller cause the controller to perform all the steps of:
  causing the robot to grasp an object with an effector, the effector including a tactile sensor providing measurements representative of physical interaction of the effector and the object;
  causing the robot to perform a set of manipulations of the object using the effector;
  acquiring measurements from the tactile sensor during said manipulations;
  forming a data representation of physical characteristics of the object from the acquired measurements; and
  controlling a further motion of the object according to the data representation of the physical characteristics and a characteristic of a desired motion of the object wherein
    causing the robot to perform the set of manipulations of the object comprises causing a set of dynamic manipulations of said object,
    acquiring the measurements from the tactile sensor during said manipulations comprises acquiring dynamic measurements based at least in part on kinematic properties of said object, and
    forming the data representation of the physical characteristics of the object comprises forming said representation to encode the kinematic properties of said object.

20. A robot comprising:
  an effector having a tactile sensor for providing measurements representative of physical interaction of the effector and objects grasped by the effector;
  a controller configured to implement all the steps of:
    causing the robot to grasp an object with the effector, including causing the tactile sensor to provide measurements representative of physical interaction of the effector and the object;
    causing the robot to perform a set of manipulations of the object using the effector;
    acquiring measurements from the tactile sensor during said manipulations;
    forming a data representation of physical characteristics of the object from the acquired measurements; and
    controlling a further motion of the object according to the data representation of the physical characteristics and a characteristic of a desired motion of the object
    wherein
    causing the robot to perform the set of manipulations of the object comprises causing a set of dynamic manipulations of said object,
    acquiring the measurements from the tactile sensor during said manipulations comprises acquiring dynamic measurements based at least in part on kinematic properties of said object, and
    forming the data representation of the physical characteristics of the object comprises forming said representation to encode the kinematic properties of said object.

21. The method of claim 2, wherein
  acquiring the measurements from the tactile sensor comprises acquiring said measurements during the performing of the at least one of the tilting manipulation and the swinging manipulation, and
  forming the data representation of the physical characteristics of the object comprises forming a data representation using dynamic measurements acquired during said tilting or swinging manipulation.

22. The method of claim 1, wherein the kinematic properties include a moment of inertial of said object.

23. The method of claim 1, wherein
  controlling the further motion comprises the robot controlling a dynamic manipulation of said object wherein a response of the object to said robot control depends on kinematic properties of said object.

24. The method of claim 1, wherein acquiring the measurements from the tactile sensor during said manipulations comprises:
  acquiring a time sequence of measurements of displacement and/or force at a plurality of locations in an area of contact between the effector and the object during the performance of the set of dynamic manipulations; and forming the data representation comprises processing said time sequence of measurements to form said data representation.

25. The method of claim 24, wherein processing the time sequence of measurements comprises:

providing the sequence of measurements as input to a first machine-learned transformation configured with values of first configuration parameters; and forming the data representation as a numerical embedding vector;

wherein controlling the further motion of the object comprises controlling said motion according to the numerical embedding vector and the characteristics of the desired motion of the object.

26. The method of claim 25, wherein controlling the further motion of the object comprises:

wherein controlling the further motion of the object comprises providing the numerical embedding vector and a data representation of the characteristics of the desired motion of the object as input to a second machine-learned transformation configured with values a second configuration parameters, and using an output of the second machine-learned transformation to control limbs and/or effectors of the robot.

27. A method for operating a robot, the method comprising:

causing the robot to grasp an object with an effector, the effector including a tactile sensor providing measurements representative of physical interaction of the effector and the object;

causing the robot to perform a set of manipulations of the object using the effector;

acquiring measurements from the tactile sensor during said manipulations;

forming a data representation of physical characteristics of the object from the acquired measurements; and controlling a further motion of the object according to the data representation of the physical characteristics and a characteristic of a desired motion of the object, wherein causing the robot to grasp the object comprises causing the robot to grasp an elongated object extending beyond the effector, and acquiring the measurements from the tactile sensor during the manipulations comprises acquiring measurements dependent on mass distribution of the elongated object.

* * * * *